Figure 1:
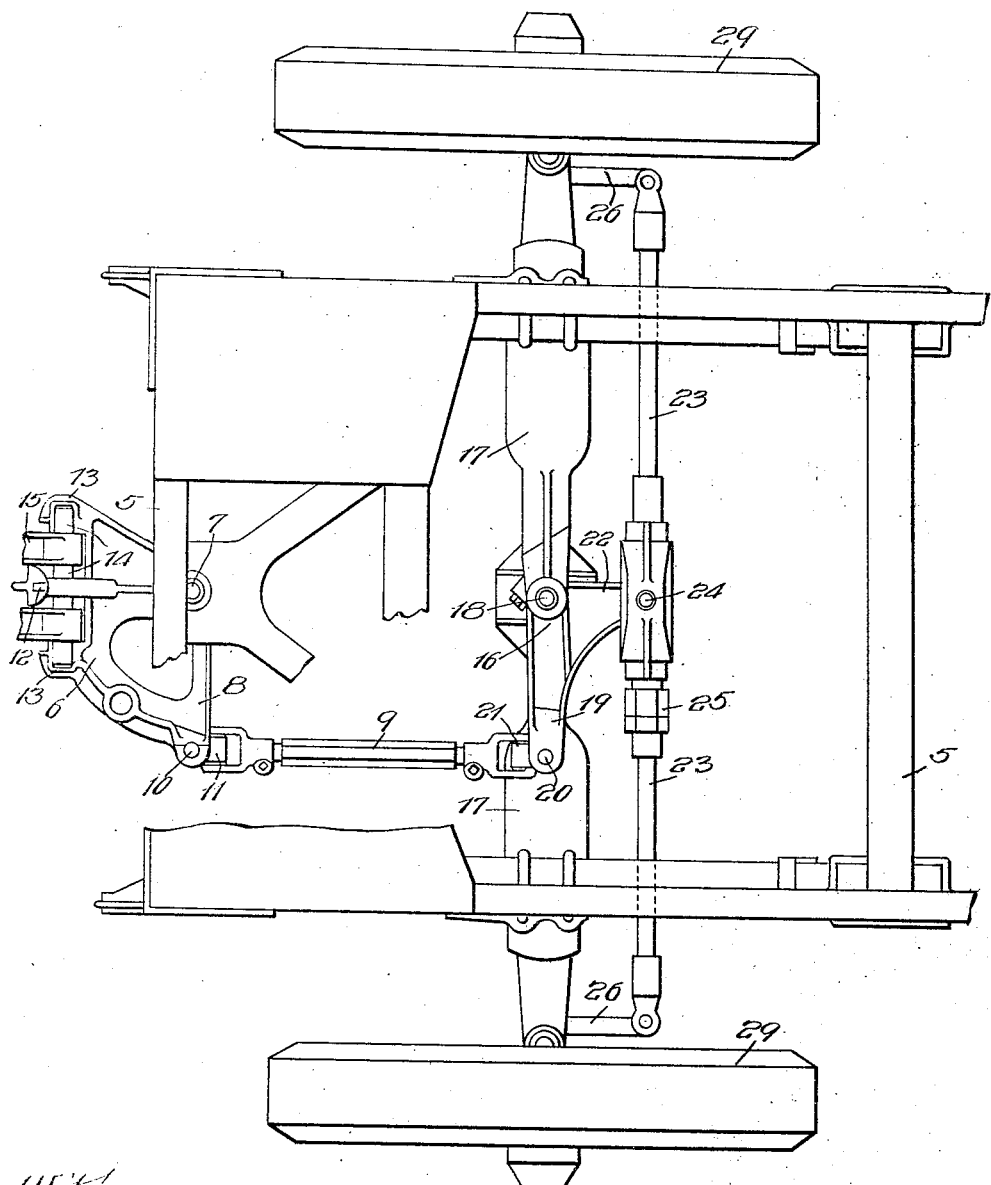

Sept. 2, 1924.

A. P. LEE

NONWEAVING STEERING MECHANISM

Filed Dec. 16, 1920  3 Sheets-Sheet 2

1,506,910

Witnesses:
W. F. Kilroy
Harry R. L. White

Inventor:
Albert P. Lee
by Zabel & Mueller
Attys.

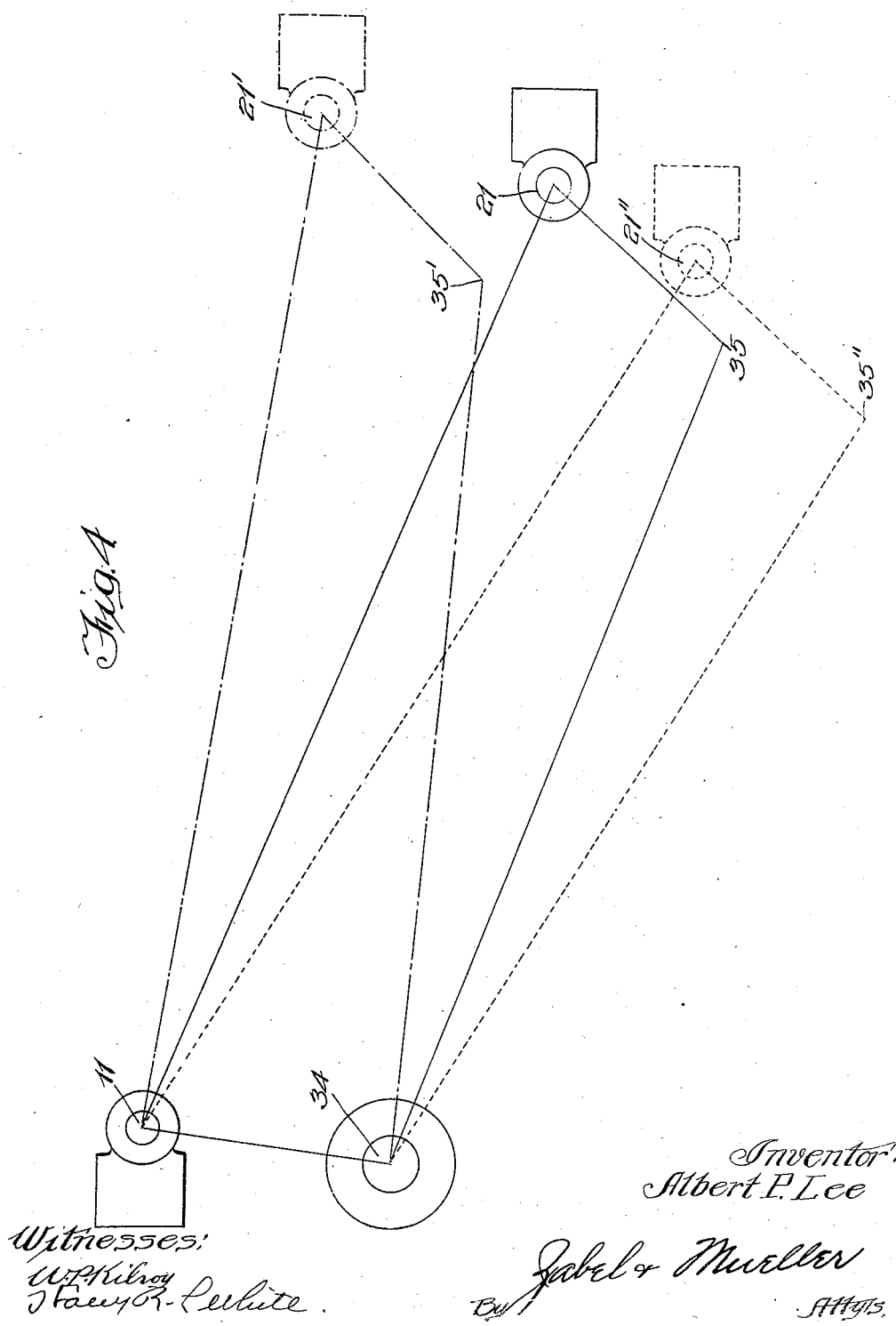

Patented Sept. 2, 1924.

1,506,910

UNITED STATES PATENT OFFICE.

ALBERT P. LEE, OF CHICAGO, ILLINOIS, ASSIGNOR TO LEE TRAILER & BODY CO., OF CHICAGO, ILLINOIS.

NON-WEAVING STEERING MECHANISM.

Application filed December 16, 1920. Serial No. 431,115.

*To all whom it may concern:*

Be it known that I, ALBERT P. LEE, a citizen of the United States, residing at Chicago, in the county of Cook and State of Illinois, have invented a certain new and useful Improvement in Nonweaving Steering Mechanism, of which the following is a full, clear, concise, and exact description, reference being had to the accompanying drawings, forming a part of this specification.

This invention relates to steering mechanisms and more particularly to a non-weaving steering mechanism for vehicles.

It is a purpose of this invention to provide a steering mechanism that is so constructed as to eliminate all weaving of the wheels due to the effect produced by the deflection of the springs of the vehicle on the steering mechanism. This is accomplished by providing a steering mechanism that is substantially uninfluenced by any deflection of the springs of the vehicle within the limits of such deflections as would ordinarily occur with the vehicle in use when both fully loaded and when running light.

This invention particularly relates to a steering mechanism whereby the vehicle is steered through a coupler or steering head which is adapted to steer the wheels mounted on pivoted stub axles, said steering mechanism comprising a bell crank lever connected at one end to a tie rod connecting steering levers mounted on said stub axles, and at its outer end to a drag link which connects said bell crank lever with said steering or coupler head. In such steering mechanisms the bell crank lever is usually pivotally mounted on the axle. However, as the axle moves toward and away from the framework of the vehicle due to the action of the springs and as the coupler or steering head is mounted on the framework, it is difficult to prevent weaving, or oscillation of the wheels due to the fact that the pivot point of the bell crank lever rises and falls with the axle. This difficulty is increased due to the fact that the proportion of certain of the parts of the vehicle are fixed within very narrow limits and are practically constant.

In order to guide the axle in its movements radius rods are provided between the framework and said axle. In the present invention the length of the drag link relative to the radius rod and the location of the pivots for the ends of the drag link and radius rods have been so arranged relative to the axle and vehicle framework that the end of the drag link where the same is pivoted to the bell crank lever will always maintain substantially the same position relative to the axle within the limits of the ordinary deflection of the springs, thus preventing movement of the bell crank lever about its pivot and weaving of the wheels, as the springs are deflected.

In the present invention the drag link is connected to the steering head and to the bell crank lever by means of universal joints and these are so arranged that the vertical axes of these joints and the pivot points for the steering head and bell crank lever form the corners of a rectangle when the vehicle is going straight ahead or of a parallelogram when the vehicle is turning.

As the length of the radius rods and their points of connection at both ends thereof cannot be varied in practice, for a given vehicle to overcome weaving and as the horizontal axis of the universal joint at the steering head end of the drag link is also substantially fixed, the only variables remaining are the length of the drag link and the position of the horizontal axis of the universal joint at the bell crank lever end of the drag link. These parts have been so proportioned relative to the length of the radius rods and the pivots thereof that the horizontal pivot of the universal joint at the bell crank end of the drag link will always have the same relative position to the axle, within the limits of the movements thereof that occur in practice, and the vertical pivot between said universal joint and bell crank lever will always be substantially vertically aligned with the axle, and there will be no turning of the bell crank lever on its pivot on account of the springing action and as a result no weaving of the wheels.

Due to the arrangement of the vertical pivots of the steering mechanism the transverse arm of the bell crank lever will always be parallel to the line drawn through the pivot of the coupler head or steering head and the pivotal connection between the drag link and coupler head, and as a result the relationship of the various parts of the steering mechanism will be substantially the same for all positions thereof, whereby much more accurate steering can be obtained than where the pivots are arranged as is shown in my application Serial No. 306,202, filed June 23, 1919, over which the present invention is an improvement and of which this application is a continuation in part.

Other objects and advantages of the invention will appear as the description of the accompanying drawings showing one form that my invention may take, proceeds. However, I desire to have it distinctly understood that I do not intend to limit myself to the exact details of structure shown in the accompanying drawings and described in the specification, but that I desire to include as part of my invention all such obvious changes of structure and modifications of parts as would occur to a person skilled in this art and as would fall within the scope of the claims.

In the drawings:—

Figure 2:
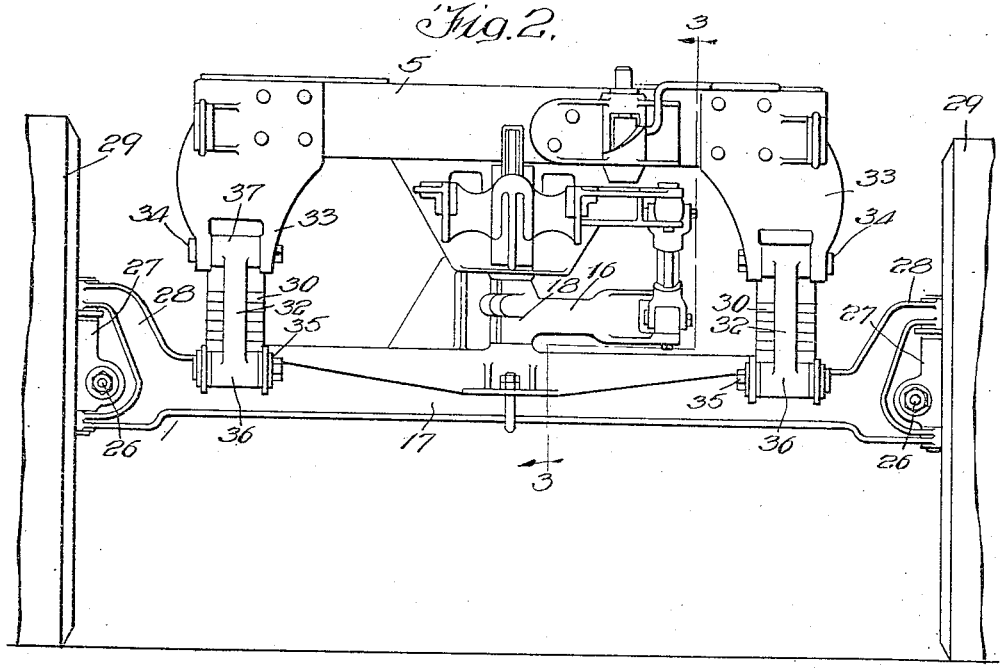
Figure 3:
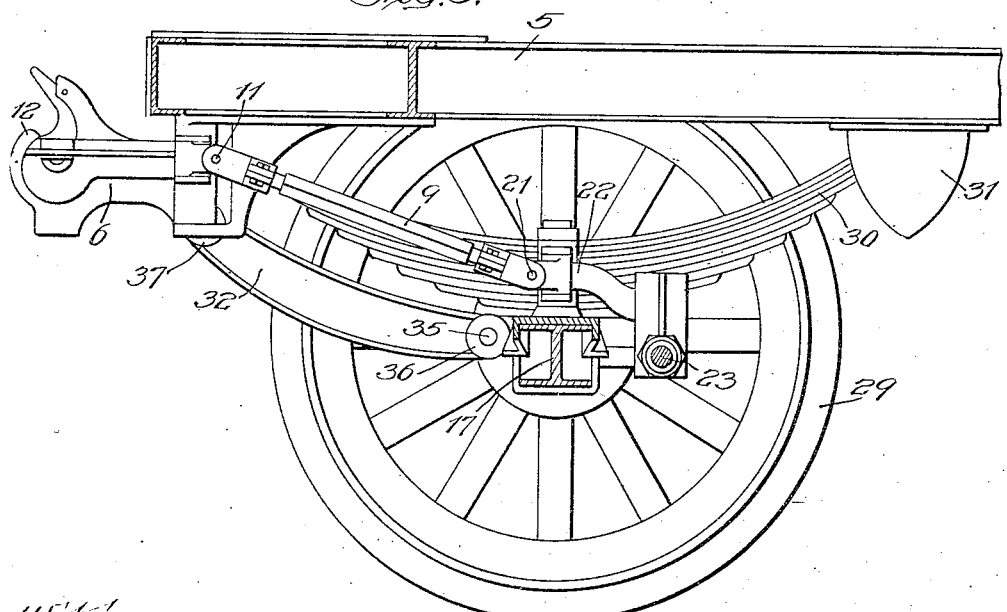

Fig. 1 is a fragmentary plan view of a vehicle framework showing my improved steering mechanism applied thereto, Fig. 2 is an end view of the vehicle framework and steering mechanism, Fig. 3 is a section taken on the line 3—3 of Fig. 2, Fig. 4 is a diagrammatic side view showing various positions of the drag link pivots for various deflections of the springs.

Referring in detail to the drawings the vehicle framework 5 is shown as having pivotally mounted thereon the coupler or steering head 6 which is pivoted to the framework at 7 and is provided with a lateral extension forming a laterally extending arm 8 to which is connected the drag link 9 by means of a universal joint having the vertical pivot 10 and horizontal pivot 11. The coupler head 6 is provided with suitable coupling devices adapted to have a draw bar or other suitable steering means secured thereto, the same being shown as comprising a central coupler finger 12 and sockets 13 at each side thereof which are adapted to receive the transverse member 14 of the draw bar 15 of which the end portion only is shown in Fig. 1. The opposite end of the drag link 9 to that connected with the coupler or steering head is connected with the bell crank lever 16 which is pivoted on the axle 17 at 18, the drag link being connected with the laterally extending arm 19 of the bell crank lever by means of a universal joint having the vertical pivot 20 and the horizontal pivot 21. The bell crank lever 16 is provided with a rearwardly extending arm 22 to which is secured the transversely extending tie rod 23 by means of a pivot 24, the tie rod 23 being provided with means of adjustment 25. Pivotally connected to the ends of the tie rod 23 are the steering levers 26 which are suitably connected with the brackets 27 provided on the stub axles pivotally mounted in the bifurcated end portions 28 of the axle 17, these stub axles carrying the wheels 29 as is customary. Interposed between the axle 17 and the vehicle framework 5 are the springs 30 which are secured to the framework by means of the brackets 31.

In order to guide the movements of the axle toward and away from the framework due to the deflection of the springs under various loads and due to rebound, the radius rods 32 are provided, the radius rods being pivoted to the brackets 33 on the framework 5 by means of horizontally extending pivots 34 and to the axle by means of horizontally extending pivots 35 which extend through the enlarged boss at the end portion 36 of the radius rod and through a bracket provided on the axle 17. The opposite end portion of the radius rod 32 is also provided with an enlargement or boss 37 similar to the boss 36.

It will be noted on referring to Fig. 1 that the pivots 7, 18, 10 and 20 form the vertices of a rectangle when the parts are in the position shown in Fig. 1, that is when the vehicle has its wheels in such a position as to move straight ahead. If the coupler or steering head 6 is turned on its pivot so that the pivot point 10 will move forwardly then the pivot point 20 will move forwardly the same distance so that the pivot points referred to above will form the vertices of a parallelogram. This will also be true if the coupler head turns about its pivot in the opposite direction so as to throw the arm 19 of the bell crank lever rearwardly. It will thus be seen that under all circumstances no matter what position the parts of the steering mechanism may assume due to the turning of the coupler or steering head that the pivot points 7, 10, 20 and 18 will form the vertices of a parallelogram. As the arm 8 of the steering head 6 and the arm 19 of the bell crank lever will always be parallel the movement of the coupler head will be very accurately transmitted to the steering devices associated with the wheels and very accurate steering will result.

It will be also noted that due to the fact that the bell crank lever is pivotally mounted on the axle, which axle moves relatively to the framework due to the load carried thereby or due to the rebound after a deflection of the springs due to some unevenness in the roadway over which the vehicle is traveling, and due to the fact that the steering or coupler head is mounted on the framework there would be a tendency for the steering mechanism to be thrown out of its proper position so as to cause an oscillation of the wheels, which is commonly called weaving, unless the parts were so arranged that any movement of the axle relative to the framework would not change the angular position of the arm 19 of the bell crank lever 16. As the drag link 9 is pivotally connected to the coupler or steering head by means of the universal joint having the horizontally extending pivot 11 and to the arm 19 of the bell crank lever by means of the universal joint having the horizontally extending pivot 21, and as the radius rod is pivotally connected to the framework by means of the horizontally extending pivot 34 and to the axle by means of the horizontally extending pivot 35, it will be seen that as the pivots 11 and 34 are fixed and as the length of the radius rod 32 is fixed that the axle will move in a path whose center will be the center of the pivot 34 and that the horizontal pivot 21 of the drag link will move in a path whose center is the center of the pivot 11. If the length of the radius rod and drag link and the position of the horizontal pivot 21 are not properly proportioned then the horizontal pivot 21 and the arm 19 of the bell crank lever associated with the universal joint carrying this horizontal pivot will be thrown either forwardly or rearwardly from its normal position as shown in Fig. 1 due to the action of the radius rod guiding the axle and due to the fact that the pivots 11 and 18 are fixed relative to the axle and framework respectively. The position of the pivot 11 and of the pivot 34 and the length of the radius rod 32 is substantially fixed or may vary only within such narrow limits due to the general requirements of vehicles of this kind that these cannot be varied in position nor in length sufficiently to overcome this weaving action of the wheels due to the movement of the axle toward and away from the framework. However, it has been found that by properly proportioning the length of the drag link 9 between its horizontal pivots 11 and 21, and by properly positioning the horizontal pivot 21 relative to the horizontal pivot 35 that the horizontal pivot 21 and consequently the laterally extending arm 19 of the bell crank lever 16 can be made to follow a path that will bear substantially the same relationship to the path of the axle, and consequently to the path of the pivot 18 throughout the normal movements of the axle relative to the framework due to the action of the load, and due to rebound.

This will be seen upon referring to Fig. 4 in which the positions of the pivots referred to are shown diagrammatically for the normal light load, for a maximum deflection of the springs due to the load of the vehicle and for a maximum rebound of the axle due to the action of the springs. It will be noted from Fig. 4 that the length of the drag link 9 is only slightly greater than the length of the radius rods 32 and that the distance between the pivots 11 and 34 is only slightly greater that the distance between the pivots 21 and 35. The position of the horizontal pivot 21 is shown for the maximum deflection due to load to be at 21′ in Fig. 4, while for maximum rebound it is shown at 21″, and in normal light load position at 21. In a similar manner the center of the radius rod pivot at the axle is shown at 35 in normal position, at 35′ in the position it would assume under maximum deflection of the springs due to load, and at 35″ the position due to maximum rebound.

It will be seen from the diagram referred to that the relative position of the horizontal pivot of the universal joint at the bell crank lever end of the drag link to the axle or to the pivot between the radius rod and the axle will be substantially the same for all positions of the drag link and radius rod between these two extremes due to the slight differences in length thereof and slight differences in the distances between the pivots referred to above, and as the relationship of the horizontal pivot 21 to the axle will be substantially the same for all positions of the axle then the relative position of the pivot 18 and the horizontal pivot 21 and consequently of the laterally extending arm of the bell crank lever will be substantially the same for all positions of the axle within the limits referred to. As the laterally extending arm of the bell crank lever will not vary substantially from the position shown in Fig. 1 due to this construction, there will be no movement of the tie rod and steering arms connected to the wheels due to the movements of the axle relative to the framework. However, it is to be understood that the pivot points referred to do not follow a path so that the relationship of the parts will be constant to mathematical accuracy, but that a very slight variation occurs which is not sufficient to effect the operation of the steering mechanism, as there is of course a slight looseness of the parts therein and the variations from a mathematically accurate construction is so slight within the limits of movements of the axle that occur in practice that it may be properly said that there is substantially no relative movement of the horizontal pivot of the universal joint connected to the bell crank lever, and consequently of the laterally extending arm of the bell crank lever due to deflection of the springs either due to load or rebound.

Having thus described my invention what I desire to claim and secure by U. S. Letters Patent is:

1. In a vehicle of the character described, a framework, an axle, springs interposed between said axle and said framework, radius rods connecting said axle with said framework, steerable wheels mounted on said axle, and means for steering said wheels comprising a bell crank lever pivotally mounted on said axle, a steering member pivoted on said framework and a link extending from said bell crank lever to said steering member, and means for connecting said link with said bell crank lever and said steering member, each comprising a member having spaced horizontal and vertical pivots, the distance between the horizontal pivotal axes of said link and said radius rods at the upper ends thereof being only slightly greater than at the lower ends thereof and the length of said drag link being only slightly greater than the length of said radius rods whereby the horizontal pivot at said bell crank lever will maintain a substantially fixed relationship to said axle within the limits of the normal movements of said axle.

2. In a vehicle of the character described, a framework, an axle, springs interposed between said axle and said framework, radius rods connecting said axle with said framework, steerable wheels mounted on said axle, and means for steering said wheels comprising a bell crank lever pivotally mounted on said axle, a steering member pivoted on said framework and a link connecting said bell crank lever with said steering member, said radius rods having horizontal pivots at the ends thereof and said link having universal joints each comprising spaced horizontal and vertical pivots, the horizontal pivots of said link and the pivots of said radius rods being out of longitudinal alignment at both ends thereof and the length of said link being only slightly greater than the length of said radius rods and the distances in a vertical plane between the pivotal axes at opposite ends of said rods and said drag link being substantially the same whereby the horizontal pivot of said link at the end thereof adjacent the axle is spaced horizontally the same distance from the radius rod pivots at the axle for all normal vertical displacements of said axle.

In witness whereof, I hereunto subscribe my name this 30th day of November A. D., 1920.

ALBERT P. LEE.